Figure 1:
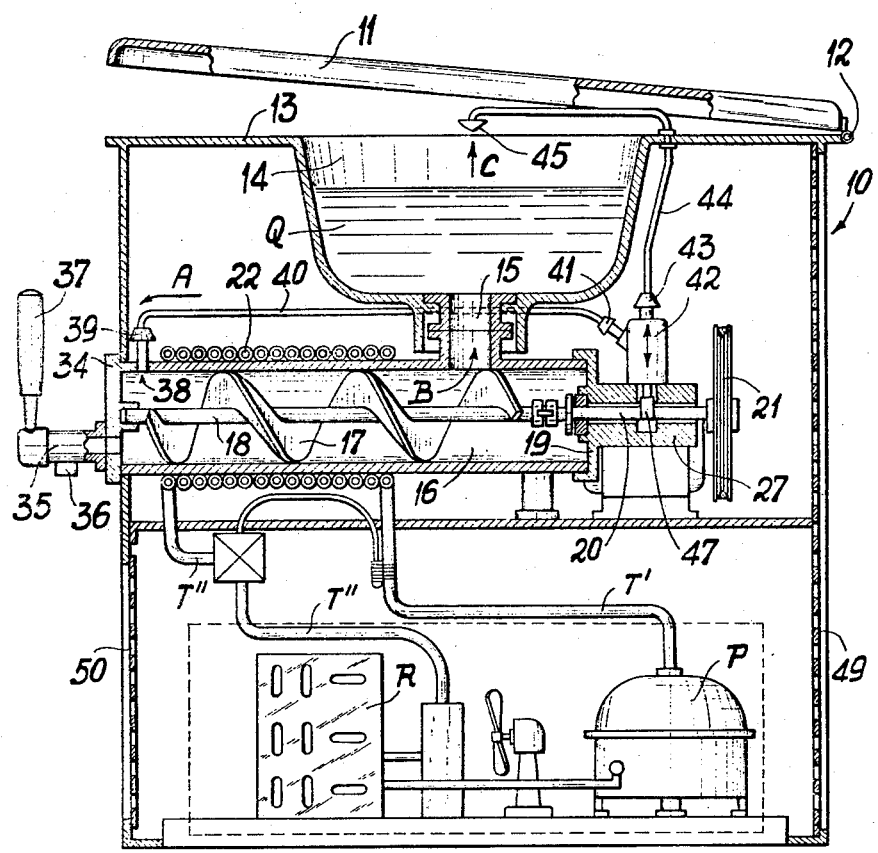

INVENTORS
Silvano Rapazzini
Alberto Cipelletti
BY
Michael J. Striker

United States Patent Office 3,196,633
Patented July 27, 1965

3,196,633
ICE CREAM FREEZER AND DISPENSER
Silvano Rapazzini and Alberto Cipelletti, both of
23 Via Imbonati, Milan, Italy
Filed Dec. 20, 1962, Ser. No. 246,268
Claims priority, application Italy, Dec. 23, 1961,
23,183/61
13 Claims. (Cl. 62—342)

This invention generally relates to ice cream freezer and dispenser devices and, more particularly, it is related to a new and improved continuous operating ice cream freezer and dispenser device of the type including a freezing tubular chamber subject to refrigeration and wherein rotary means are arranged and operated for beating a liquid compound into a pasty product and for urging said product towards a chamber outlet end portion, while the liquid compound is fed into the opposite chamber inlet portion of said chamber from a supply vat or basin arranged thereabove, as amounts of ice cream are dispensed from a valve controlled dispensing outlet associated to and communicating with said chamber outlet end portion.

It is known to those skilled in the art to which this invention appertains that such frozen eatable products are best palatable and in demand as possessing a lightweight and foamy consistency. Such consistency may be attained upon injecting into and thoroughly mixing with the pasty frozen product a pressurized gaseous matter such as pressurized air. Said pressurized air must obviously be carefully purified and refrigerated prior to its injection in the eatable paste.

It is further known that for proper and relatively fast processing of the liquid compound or mix in the chamber of the freezing unit of the device, such compound or mix must be preferably kept at a relatively low temperature in said supply vat, namely at a temperature only slightly above the processing temperature in the tubular chamber of the freezing and processing unit. A number of ice cream freezer and dispenser devices of the type referred to above are provided with refrigerating means associated either to said processing chamber or to said supply vat.

Having the above and other conditions in mind, it is therefore a primary object of this invention to provide a new and advantageous approach to the problems involved in injecting pressurized air into the processed eatable paste for imparting the most desirable foamy consistency thereto and in properly refrigerating the pool of supply liquid mix in said supply vat.

More particularly, it is an object of this invention to provide a new and improved ice cream freezing, processing and dispensing device of the above type, the improvement consisting in providing the device with a source of pressurized air, with means adapted to feed and inject into the outlet end portion of the processing chamber the pressurized air in an amount largely in excess of the amount required to emulsify the paste to the desired foamy consistency, so that said paste is properly emulsified prior to dispensing thereof, while the excess of air is caused to escape from said processing chamber by going therethrough and therealong towards the supply passage from the mix supply vat, then upwardly through the supply passage and then gurgling or bubbling through the liquid mix in the vat, so that said liquid mix will be properly refrigerated by said escaping air, which has been previously refrigerated upon its travel along the refrigerated processing chamber.

According to an advantageous feature of this invention, the said source of pressurized air consists of a pump driven by or operated in accordance with the motion of the beating rotary means in the processing chamber, whereby the injection of pressurized air occurs during the beating steps of cream processing only, to ensure the thorough mixing of air and pasty matter and the proper emulsifying of said latter matter.

According to a further advantageous feature of this invention, the said supply vat is confined within an enclosure wherein a space is formed above the surface of the liquid mix in said vat, and the said pump has an outlet connected with said outlet end portion of said chamber, for injecting pressurized air thereinto, and an inlet connected with a duct having its entrance opening in said space, whereby the said pump is prevailingly fed with the air bubbling up and escaping from said liquid mix in said supply vat, and said air is therefore recirculated in the processing chamber. The relatively small amounts of air emulsified with the pasty matter in the processing chamber and dispensed with the ice cream may be replaced by feeding corresponding amounts into said space, preferably through an inlet opening provided with filtering means.

The above summarized provision and arrangement of means have been proved as very advantageous either in view of their simplicity of construction and reliability of operation, and in consideration of the facts that properly cold and purified air is fed and injected into and emulsified with the eatable paste.

Figure 2:
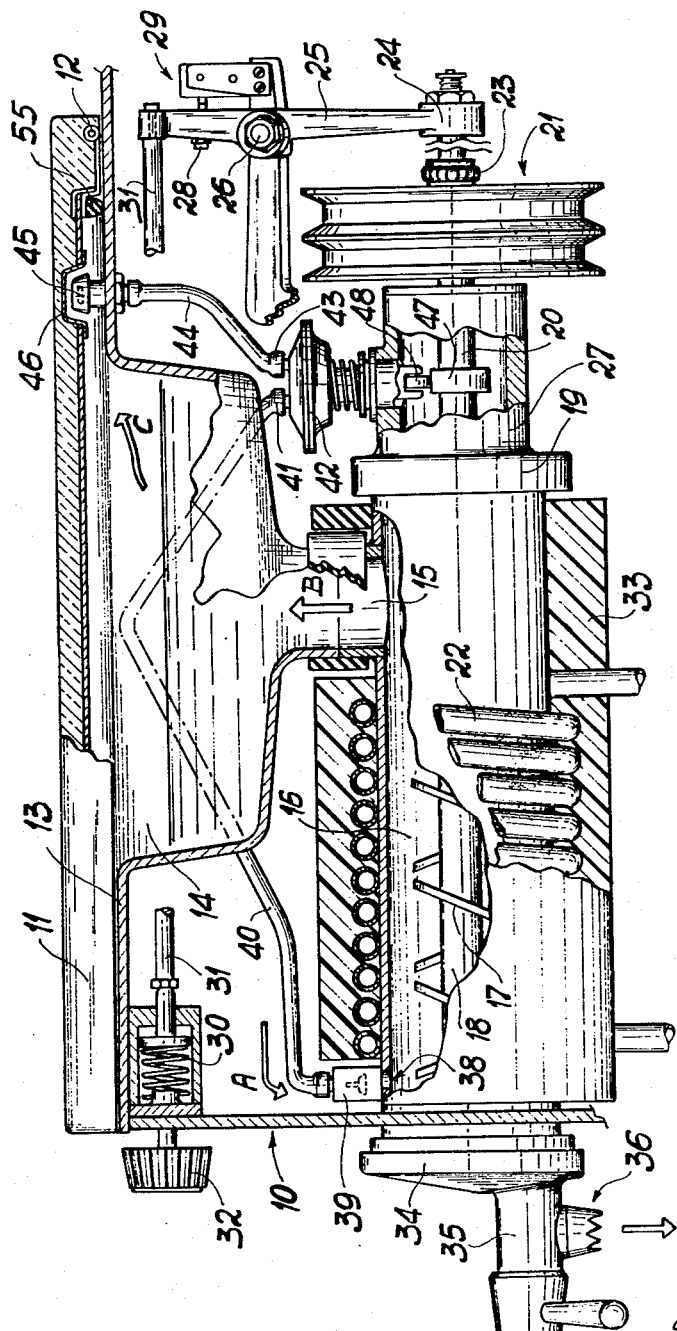

Other objects and advantages of the invention are in part obvious and in part will be made apparent as this description proceeds, and the novel features of this invention are set forth in the appended claims. The present invention however, both as to its construction and operation, will be best understood by way of illustration and example by the following detailed description of preferred forms of embodiment thereof, when taken in conjunction with the accompanying drawings, forming an essential component of this disclosure, and wherein:

FIGURE 1 diagrammatically illustrates, partly in vertical sectional view and partly in side elevation, an ice cream freezer, processing and dispenser apparatus improved according to this invention, and FIGURE 2 is a similar illustration of the freezing and processing unit thereof, together with the associated supply vat and other devices, such illustration showing certain advantageous structural details of a preferred form of embodiment of the invention.

Referring now to the drawings, wherein like references refer to like or equivalent parts and elements throughout the two figures of the accompanying drawings:

The various devices and means of the ice cream freezing, processing and dispensing apparatus are suitably arranged and enclosed into a casing generally indicated at 10. Such casing is provided with a cover 11 hingedly connected at 12 to a side portion of the upper wall 13 of said casing. A supply vat 14 adapted to contain a supply pool Q of liquid compound of mix is formed in said upper wall 13 and therefore a confined space is formed within said vat, above the surface of the liquid content thereof and below the said cover 11, upon proper lowering thereof on and in substantial airtight relationship with said upper wall 13 of the casing.

A substantially short vertical passage 15 is formed at the bottom of vat 14 for communication thereof with the rear or inlet end portion of freezer and processing chamber 16, wherein a rotary beating device 17 is coaxially and rotatably supported. Such beating device 17 is constructed, according to prior art, as a screw feeder or includes helically arranged paddles, so the upon rotation of said beating device, the liquid mix fed into said chamber 16 is beaten into the desired pasty product and is continuously urged towards and into the outlet end portion of said chamber, adjacent to a chamber outlet head member 34.

The beating and screw feeder component or components 17 may be secured to and driven by a shaft 18, which is drivingly connected to a driving shaft 20 rotatably supported into a hub member 27 secured to or made integral with a chamber inlet head member 19. The said beating and screw feeder assembly may be motor driven, according to the art, by a suitable electric motor (not shown) or other source of rotary motion, through a transmission including one or more transmission belts, for example, drivingly engaging a pulley 21 secured to an end portion of said shaft 20.

The said processing chamber 16 is formed within a cylindrical enclosure which is refrigerated by known refrigerator means including a refrigerating circuit formed by an evaporator coil 22 wound about the freezing chamber outlet or fore portion and middle portion, and comprising a refrigerating unit having a compressor P, a condenser R and other known implements, connected in said circuit by suitable pipings T' and T''.

Further according to current knowledge, the produced ice cream may be dispensed from the apparatus through a duct formed into a projection 35 of the outlet chamber head member 34 and having an ice cream dispersing outlet at 36, controlled by conventionally constructed valve means in said projection 35 and provided with handle means such as at 37. The ice cream flows from said outlet 36, upon opening of said valve means, as the pasty matter within the processing chamber 16 is continuously urged into said duct and outlet by the feeder screw operation of screw component or components such as at 17 rotating in said chamber.

According to the invention, a pressurized air outlet is arranged at 38 in the said fore or outlet end portion of chamber 16, whereby said pressurized air is caused to thoroughly mix with and emulsify the already beaten and frozen pasty material in said chamber portion. Said air outlet is preferably provided with a check valve at 39 to prevent the matter contained in said processing chamber 16 from flowing into the pressurized air feeding duct when no or little pressure is applied to said duct.

The source of pressurized air consists of an air pump 42, having an outlet at 41, connected to said outlet at 38 via a feed duct 40, and intake at 43 connected, via an intake duct 44, to an air intake arranged within the said confined space formed above the surface of the liquid content of supply vat 14, such as at 45. Therefore the said pump 42 is fed with air sucked from said space. The said pump 42 may be of rotary or of reciprocating type, such as a diaphragm pump, and including movable parts which, as operating in contact with the pumped air, do not require lubrication to prevent contamination of such air. Said pump may be operated by its own separate motor or, preferably by a rotary component of the ice cream processing means of the unit. Said pump may be therefore advantageously reciprocated by a cam 47 keyed to or integrally formed with said processing means driving shaft 20.

The said pump 42 or other suitable source of pressurized air is dimensioned and driven to supply pressurized air largely in excess of the amount and rate required for properly emulsifying the pasty material to be dispensed by the apparatus. Therefore a relatively small amount of air ejected at 38 into the processing chamber fore portion will be entrapped into said pasty material, while the excess of air, i.e. the prevailing amount thereof, is caused to find its way for escaping from chamber 16. Such excess of air is therefore caused to go through and along said chamber 16, in direction opposite to the direction in which said material is progressively advanced in said chamber by feeder means such as at 17, until passage 15, full with liquid mix from supply vat 14 is located thereover. The air can therefore upwardly escape in direction B, bubbling along the height of the liquid content of said passage 15 and vat 14, in the confined space above the surface of said liquid content, and is sucked again in direction C in the air intake at 45, to be recirculated by pump 42 and fed under pressure in direction A at the outlet at 38 in the fore portion of chamber 16 for further emulsifying the pasty material processed thereinto.

As the said excess of air, ejected at 38 in the chamber fore portion, progresses towards passage 15 along the refrigerated fore and middle portions of said freezing chamber, it is subjected to cooling, and then in turn cools the liquid content of vat 14 while bubbling therethrough.

It will be therefore apparent that the present invention provides extremely simple and reliable means both for emulsifying the pasty eatable material to be dispensed and for levelling and maintaining at the most desirable low temperature the amount Q of liquid mix in supply vat 14, as required for proper service of the apparatus. Provided that the whole space confined within processing and freezing chamber 16, passage 15, vat 14 and the space above the surface of the content of said vat, is kept at a relatively low temperature, the air sucked at 45 for recirculation is at a corresponding low temperature and well adapted for injection at 38 in the fore portion of chamber 16. The progressive addition of further air to compensate the air entrapped in the ice cream material and dispensed therewith, as being in amount largely smaller than the amount of the whole circulated air, does not substantially influence the balance of temperature of the apparatus. The said circulated air, as being circulated within confined spaces, is not contaminated by external air, namely if filter or otherwise air purifying means are provided for entrance of additive air in said confined spaces, namely in the space above the content of supply vat.

The arrangement of said cover 11 to enclose the said vat 14 provides a positive separation of the spaces wherein the eatable matter is processed and the spaces wherein the various mechanisms and implements are arranged. Such latter spaces may on the contrary communicate with external, through perforated wall portions 49 and 50 of casing, for example, particularly for readily exhausting the heat absorbed from the refrigerated parts and emitted by the condenser R of the refrigerating unit.

Some preferred details of construction of the improved device of the invention are particularly shown in FIG. 2. The said pump 42 is shown as embodying a reciprocating diaphragm pump whose diaphragm is reciprocated by cam 47 through a roller cam follower 48. To prevent that the liquid content of supply vat 14 may reach the intake 45 and therefore sucked into pump 42, said intake 45 is located outside the area above said vat 14 and into a recess 46 provided in cover 11, which is provided with a layer of heat-insulating material, and which is made substantially air-tight in respect with upper wall 13 of the casing, about the opening of vat 14, by a suitable gasket 55. A corresponding heat-insulating material 33 is arranged about the refrigerated processing and freezer chamber 16 also.

The apparatus fragmentarily shown in FIG. 2 has a refrigerating unit controlled upon variation of resistance encountered by the beating members 17 and as a function of the corresponding axial thrust applied to shaft 18 thereof. Such thrust is applied, through a suitable axial ball bearing 23, to one end portion 24 of a two-armed lever 25 pivoted at 26 on a stationary component of the frame structure of the apparatus and whose other end portion is provided with an adjustable pusher 28 acting on a micro-switch 29 connected in circuits (not shown) feeding the beating members driving motor (not shown). The control of said feeding circuits may be adjusted by acting on a knob 32 to vary the load of a spring 30 which, through a rod 31, acts on said two-armed lever 25 to resist within predetermined limits to the said axial thrust applied to shaft 18, as a function of the consistency of the processed material.

It is therefore believed to be evident that the present inevntion provides a plurality of advantageous features, and it will be understood that each of the new features described and shown and any combination thereof may also find useful application in other equipment differing from the one described.

Without further consideration, the foregoing will so fully reveal the gist of this invention that others can, by applying current knowledge, readily adapt it for other applications without omitting features that, from the standpoint of prior art, fairly constitute essential characeristics of this invention and, therefore, such adaptations should and are intended to be comprehended within the spirit and meaning of this invention as above set forth and defined in and by the appended claims.

Having thus described the invention, what we claim as new and desire to have protected by Letters Patent of the United States of America is:

1. In a continuous operating ice cream freezer and dispenser device including a refrigerated freezing and processing chamber having a fore portion associated with ice cream dispensing means and a rear portion, a supply means located above said chamber and communicating with said rear portion thereof for supplying a liquid mix thereto, and rotary means having helical components, supported and driven in said chamber for beating the said mix into a pasty material and for progressing and urging said material from said rear portion towards and into said fore portion and outside said ice cream dispensing means, the improvement including a source of pressurized air communicating only with said fore portion closely adjacent to said dispensing means for supplying to the material in said fore portion of said chamber air at a rate largely in excess of the amount required for emulsifying said pasty material into a foamy ice cream to be dispensed therefrom, and to cause thereby the excess of the said air to flow rearwardly through the chamber to be cooled by contact with said refrigerated chamber and the material therein, to escape from said chamber through the rear portion thereof and to bubble through the said liquid mix in said supply vat for refrigerating said liquid mix.

2. The improved device of claim 1, wherein the said supply vat has an upper opening confined within an upper casing wall portion of the device, and wherein a cover is movably connected to said upper wall portion to cover said vat opening and form the enclosure constituting said vat.

3. The improved device of claim 1, wherein the said source of pressurized air consists of a pump drivenly connected to a rotary member subject to rotation together with said rotary means.

4. The improved device of claim 1, wherein the said source of pressurized air consists of a diaphragm reciprocating pump, wherein the said rotary means comprise a rotary driving shaft means, and wherein said driving shaft means is rotatably connected to cam means arranged for reciprocation of said reciprocating pump.

5. In a continuous operating ice cream freezer and dispenser device adapted for dispensing ice cream of foamy consistency, in combination with an ice cream freezing, processing and dispensing unit including a refrigerated tubular chamber wherein rotary means including helical surface portions are arranged and rotated for progressing and urging an ice cream mix from a rear portion towards and into a fore portion of said chamber while processing said mix into a pasty material, a supply vat arranged above said chamber and adapted to contain a supply pool of liquid mix, and an essentially vertical passage connecting a bottom portion of said supply vat to an upper portion of said chamber rear portion for feeding said mix in said chamber: pumping means sized and operated for feeding pressurized air at a rate largely in excess of the air which may be entrapped in the dispensed foamy ice cream upon emulsifying said pasty material in said chamber fore portion, said pumping means having an outlet and an intake, pressurized air feed duct means connected to said pumping means outlet and having a pressurized air injection outlet in said chamber fore portion, and an air supply duct means connected to said pumping means intake and having an inlet opening located for suction of not emulsified air escaping from said tubular chamber through said vertical passage and upwardly bubbling through said pool of liquid mix in said supply vat.

6. The combination defined in claim 5, further comprising cover means for essentially airtightly covering said supply vat to form an essentially closed space above the surface of said liquid mix in said supply vat, the said air supply duct inlet opening being located in said closed space.

7. The combination defined in claim 5, further comprising check valve means in the said pressurized air feed duct means adjacent said injection outlet thereof, said check valve means being arranged to admit passage of fluid matter from said pumping means to said chamber fore portion only.

8. The combination defined in claim 5, wherein the said pumping means consist of a reciprocating pump, and further comprising means operatively connected to said rotary means for reciprocatingly driving said pump.

9. An ice cream freezer and dispenser comprising, in combination, an elongated substantially horizontal chamber having a fore end portion and a rear end portion; an operator controlled ice cream outlet at said fore end portion; a mix supply passage communicating with said rear end portion; refrigerator means in heat exchange relation with said chamber for cooling the mix supplied thereto; rotary agitating and feed means in said chamber for agitating the mix therein and for urging the same from said rear to said fore end portion; pump means communicating with the interior of said chamber at said fore end portion for feeding pressurized air, in excess of the amount required to make the ice cream in said chamber foamy, into said fore end portion of said chamber so that the excess air passes in counterflow to the mix in the chamber from said fore end portion to said rear end portion to be cooled thereby during contact with the refrigerated mix; and air inlet duct means connected to said pump means and having an inlet end located upstream of said mix supply passage so that the excess air cooled by contact with said refrigerated mix will be recirculated by said pump means.

10. An ice cream freezer and dispenser comprising, in combination, an elongated substantially horizontal chamber having a fore end portion and a rear end portion; an operator controlled ice cream outlet at said fore end portion; a mix supply vat located above said rear end portion of said chamber; a mix supply passage providing communication between said mix supply vat and said rear end portion of said chamber; refrigerator means in heat exchange relation with said chamber for cooling the mix supplied thereto; rotary agitating and feed means in said chamber for agitating the mix therein and for urging the same from said rear to said fore end portion; pump means communicating with the interior of said chamber at said fore end portion for feeding pressurized air, in excess of the amount required to make the ice cream in said chamber foamy, into said fore end portion of said chamber so that the excess air passes in counterflow to the mix in the chamber from said fore end portion to said rear end portion to be cooled thereby during contact with the refrigerated mix and so that the cooled air passes through said mix supply passage into said vat; and air inlet duct means connected to said pump means and having an inlet end located above the mix in said vat so that the excess air cooled by contact with said refrigerated mix will be recirculated by said pump means.

11. An ice cream freezer and dispenser comprising, in combination, an elongated substantially horizontal chamber having a fore end portion and a rear end portion; an operator controlled ice cream outlet at said fore end portion; a mix supply vat located above said rear end, said mix supply vat having an open upper end portion of said chamber; cover means closing said open end of said vat and forming an enclosed space above the mix in said vat; a mix supply passage providing communication between said mix supply vat and said rear end portion of said chamber; a refrigerator coil surrounding said chamber for cooling the mix supplied thereto; rotary agitating and feed means in said chamber for agitating the mix therein and for urging the same from said rear to said fore end portion; pump means communicating with the interior of said chamber at said fore end portion for feeding pressurized air in excess of the amount required to make the ice cream in said chamber foamy into said fore end portion of said chamber so that the excess air passes in counterflow to the mix in the chamber from said fore end portion to said rear end portion to be cooled thereby during contact with the refrigerated mix and so that the cooled air passes through said mix supply passage into said vat; and air inlet duct means connected to said pump means and having an inlet end located in said enclosed space above the mix in said vat so that the excess air cooled by contact with said refrigerated mix will be recirculated by said pump means.

12. In a continuous operating ice cream freezer and dispenser device, the combination including a refrigerated freezing and processing chamber having a fore portion associated with ice cream dispensing means and a rear portion spaced from said fore portion; means including a vat located above said chamber and formed by an enclosure defining a substantially closed space for supplying to said rear portion of said chamber a liquid mix; rotary means having helical components, said rotary means being rotatably disposed in said chamber for beating said mix into a pasty material and for progressing and urging said material towards and into said fore portion for removal therefrom through said ice cream dispensing means; a source of pressurized air communicating with said fore portion of said chamber for supplying to the material in said fore portion air at a rate largely in excess of the amount required for emulsifying said pasty material into a foamy ice cream to be dispensed through said dispensing means, and to cause thereby the excess of said air to flow rearwardly through said chamber to be cooled by contact with said refrigerated chamber and the material therein to escape from said chamber through the rear portion thereof and to bubble through said liquid mix in said supply vat, said source of pressurized air comprising a pump having intake means connected to said closed space for sucking off and recirculating said excess air reaching said closed space.

13. In a continuous operating ice cream freezer and dispenser device, the combination including a refrigerated freezing and processing chamber having a fore portion associated with ice cream dispensing means and a rear portion spaced from said fore portion; means including a vat located above said chamber and formed by an enclosure defining a substantially closed space for supplying to said rear portion of said chamber a liquid mix; rotary means having helical components, said rotary means being rotatably disposed in said chamber for beating said mix into a pasty material and for progressing and urging said material towards and into said fore portion for removal therefrom through said ice cream dispensing means; and a source of pressurized air communicating with said fore portion of said chamber for supplying to the material in said fore portion air at a rate largely excess of the amount required for emulsifying said pasty material into a foamy ice cream to be dispensed through said dispensing means, and to cause thereby the excess of said bar to flow rearwardly through said chamber to be cooled by contact escape from said chamber through the rear portion thereof and to bubble through liquid mix in said supply vat, said source of pressurized air comprising a pump having intake means connected to said closed space for sucking-off and recirculating said excess air reaching said closed space, outlet means, a feed duct connected to said outlet means and provided with an outlet end portion connected to said fore portion of said chamber for injecting pressurized air thereinto, and a check valve arranged in said outlet end portion of said feed duct for preventing movement of material from said fore portion toward said pump.

References Cited by the Examiner

UNITED STATES PATENTS

| | | | |
|---|---|---|---|
| 651,412 | 6/00 | Bieder | 62—70 |
| 1,408,774 | 3/22 | Peck | 62—69 |
| 1,911,731 | 5/33 | Vogt | 62—342 X |
| 3,147,601 | 9/64 | Tacchella | 62—136 |

ROBERT A. O'LEARY, *Primary Examiner.*